US00H002238H

(19) United States
(12) Statutory Invention Registration
Andrews, Jr. et al.

(10) Reg. No.: US H2238 H
(43) Published: May 4, 2010

(54) MAGNETIC PARTICLE SEPARATOR

(75) Inventors: George A. Andrews, Jr., Fredericksburg, VA (US); William P. Adams, Mechanicsville, VA (US)

(73) Assignee: The United States of America as represented by the Secretary of the Navy, Washington, DC (US)

(21) Appl. No.: 11/879,520

(22) Filed: Jun. 26, 2007

Related U.S. Application Data

(60) Provisional application No. 60/835,967, filed on Jul. 26, 2006.

(51) Int. Cl.
*B01D 35/06* (2006.01)

(52) U.S. Cl. ..... 210/695; 210/222; 210/223

(58) Field of Classification Search ..... 210/222, 210/223, 695; 95/28; 96/1–3
See application file for complete search history.

(56) References Cited

U.S. PATENT DOCUMENTS

| | | | | | |
|---|---|---|---|---|---|
| 4,170,447 | A | * | 10/1979 | Goldstein et al. | 423/215.5 |
| 4,293,410 | A | | 10/1981 | Streuli et al. | 210/107 |
| 4,306,970 | A | * | 12/1981 | Tanaka et al. | 210/222 |
| 4,432,873 | A | | 2/1984 | Schuster | 210/223 |
| 4,472,275 | A | | 9/1984 | Yano | 210/223 |
| 5,628,900 | A | | 5/1997 | Naito | 210/223 |
| 5,891,332 | A | | 4/1999 | Okamoto | 210/223 |
| 5,932,096 | A | | 8/1999 | Saho et al. | 210/208 |
| 6,210,572 | B1 | | 4/2001 | Tulchinskiy | 210/223 |
| 6,337,012 | B1 | | 1/2002 | Devine | 210/223 |
| 6,835,308 | B2 | | 12/2004 | Elsegood | 210/222 |
| 2004/0031759 | A1 | * | 2/2004 | Richard | 210/695 |
| 2006/0102533 | A1 | | 5/2006 | Faria | 210/130 |

OTHER PUBLICATIONS

B. Bai et al., "Quantitative Analysis of Air Convection Caused by Magnetic—Fluid Coupling", *AIAA J.*, v. 37, No. 12, Dec. 1999, pp. 1538–1543.

* cited by examiner

*Primary Examiner*—Michelle Clement
(74) *Attorney, Agent, or Firm*—Gerhard W. Thielman

(57) ABSTRACT

A process for separating entrained particles from a medium is provided. The medium flows into an intake port, through a separation region and out an exit port. The process includes disposing a separation region between the intake and outlet ports and positioning a magnet having north and south poles at opposite ends of the separation region. For orientation, the ports are disposed along a flow axis, and the opposite ends are disposed parallel to a pole axis transverse to the flow axis. The method operates by the magnet applying Lorenz force on the particles having one of positive and negative charges away from the separation region, wherein the particles avoid the outlet port without obstructing through the separation region. Similarly, a device for separating the particles is similarly described. In addition, the method and device further include a chamber being disposed adjacent to the separation region to collect the particles. In particular, the chamber can represent a first chamber disposed between the separation region and the south pole to collect the particles having positive charge, and a second chamber disposed between the separation region and the north pole to collect the particles having negative charge.

4 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MAGNETIC PARTICLE SEPARATOR

CROSS REFERENCE TO RELATED APPLICATION

Pursuant to 35 U.S.C. §119, the benefit of priority from provisional application 60/835,967, with a filing date of Jul. 26, 2006, is claimed for this non-provisional application.

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to separation of particles in a moving fluid by using a magnetic field. In particular, the invention relates to introduction of a magnetic field to a moving medium having entrained particles to be separated therefrom.

Removing particulate matter from fluid flow represents an objective for many applications, including purification and sampling. Conventional separation techniques of solid objects entrained from a liquid medium include methods using sieve, impaction, centrifugal, electrostatic etc. The sieve employs a physical gate to trap particles above a selected scale while permitting the medium to penetrate. Impaction uses a physical obstacle against which a particle impinges while the fluid traverses around due to differences in material inertia between the particles and the medium. Spinning the medium in a centrifuge enables separation by differences in density between the medium and the particles. Electrostatic techniques impart charge to particles, which also require electrical power.

Each of these techniques presents limitations under particlar circumstances. For example, introduction of barriers or obstacles introduces pressure drop into the flow that requires power to overcome, and may introduce turbulence as an unintended consequence.

Conventional separation of particles from fluid medium yields disadvantages addressed by various exemplary embodiments of the present invention. In particular, a process for separating entrained particles from a medium is provided. For example, the medium flows into an intake port, through a separation region and out through an exit port. In various exemplary embodiments, the process includes disposing a separation region between the intake and outlet ports and positioning a magnet having north and south poles at opposite ends of the separation region.

For orientation, the ports are disposed along a flow axis, and the opposite ends are disposed parallel to a pole axis transverse to the flow axis. The method operates by the magnet applying Lorentz force on the particles having one of positive and negative charges away from the separation region, wherein the particles avoid the outlet port without obstructing through the separation region. Similarly, a device for separating the particles is similarly described. In addition, the method and device further include a chamber being disposed adjacent to the separation region to collect the particles.

Various exemplary embodiments include providing a chamber disposed adjacent to the separation region to collect the particles. Specifically, the chamber can represent a first chamber disposed between the separation region and the south pole to collect the particles having positive charge, and a second chamber disposed between the separation region and the north pole to collect the particles having negative charge.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

Figure 1:
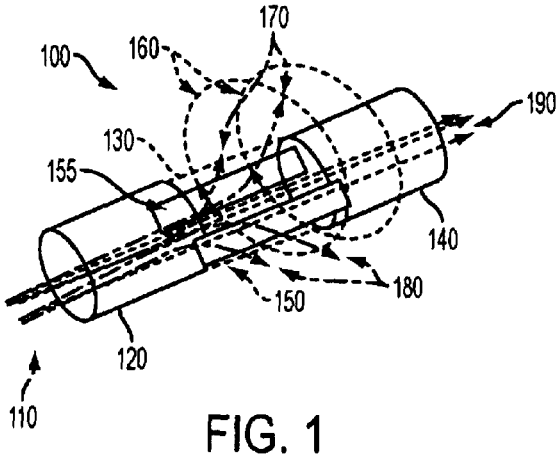
FIG. 1 shows an isometric view of a magnetic filter in accordance with a first embodiment.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Conventional particle isolation systems in flow-fields are mechaniccally or electrostatically based. The latter involves either maintaining a voltage difference across the flow or the insertion of a charge conductor into a flow so as to separate out the charged pollutants via a static electric field. The former entails inserting fiber based material into the flow so as to capture particulates via collision. Thus, either a power supply is needed, thereby imposing equipment and/or operational cost or else an obstruction to the flow, thereby inducing a pressure drop, either of which can yield adverse consequences. However, the magnetic separator, does not inhibit fluid or gas flow and thus has no power requirements if permanent magnets are utilized.

Various exemplary embodiments as described herein utilize the fundamental physical force known as the Lorentz force:

$$F_{B=qv\times B}, \quad (1)$$

where $F_B$ is the force vector developed from the magnetic field, q represents charge, v is the velocity vector that cross-products B that is the magnetic field vector representing magnetic flux density. All of these quantities are non zero for moving airborne aerosols of chemical, biological and radiological (CBR) interests in the presence of a magnetic field.

Besides being based upon sound physics, a crude experiment was performed that verifies the feasibility of the invention for even low wind speeds. In this experiment, we brought a set of moderately strong permanent magnets rated at ~180 lbs of pull force near a flowing smoke stream generated from burning oil and moving at a wind speed of ~5 mi/hr. The entire smoke stream was markedly displaced by the presence of the magnets as compared to the smoke's path without them. This concepts forms the bases of experimental particle physics and explains shielding of the Earth from the solar wind.

The advantages to this concept over conventional separation techniques discussed in the background section are that (a) magnetic separator does not inhibit flow, (b) the magnetic separator requires no energy if permanent magnets are used, and (c) it is also possible to tailor the separator to specific applications by manipulating the velocity vector of the flow v and/or the geometry of the magnetic field vector B.

In lieu of permanent magnets, electromagnets could also be used that require very low power supplies (e.g., batteries). This would allow for stronger magnetic fields but diminish the energy advantage somewhat. However, the cost would be minimal because magnetic fields are directly proportional to current which allows a low resistance wire to be used in conjunction with a small power supply to produce very large magnetic fields.

The various exemplary particle separation embodiments include a magnetic filter, a magnetic concentrator, an isolator and a deposition inhibitor. Each of these concepts utilizes the vector nature of the fundamental physical force known as the Lorentz force, as described previously in eqn. (1). As before these quantities are non-zero for moving airborne aerosols of CBR interests in the presence of a magnetic field. The Lorentz force, being a vector quantity, turns a moving charged particle according to the well known right-hand-screw rule, causing the particle to undergo circular motion. Thus, particles will circle indefinitely in a trapped fashion allowing the concentration to accumulate until the critical threshold is reached or detection.

As described for a first embodiment, a magnetic filter separates out charged particulates from a fluidic or gaseous flow stream without obstructing the flow. FIG. 1 illustrates an isometric conceptual view for a single exemplary filtration device 100. The filter can be utilized for CBR filtration either as a pre-filter, or as a stand alone unit. The filter can be concatenated to achieved desired levels of filtration. Filtered out particulated can then be captured using traditional methods.

The filter device 100 receives an inflow 110 of gas (e.g., air) and particulate matter into an inlet duct 120 through which the gas and particles enter a separation region 130 that is connected to an outlet duct 140. A north (N) magnet end 150 and a south (S) magnet end 155 in combination produce a magnetic field 160. The N and S portions may be disposed on starboard and port sides of the separation region 130 as shown.

Dust and other small particles entrained in gaseous flow readily acquire an electric charge from collisions with neighboring molecules. Positively charged particles 170 deflect upward between the N and S portions (as disposed), whereas negatively charged particles 180 deflect downward between the magnet ends. Thus, the particles 170, 180 are ejected, enabling filtered gas 190 to flow through the outlet duct 140.

Figure 2:
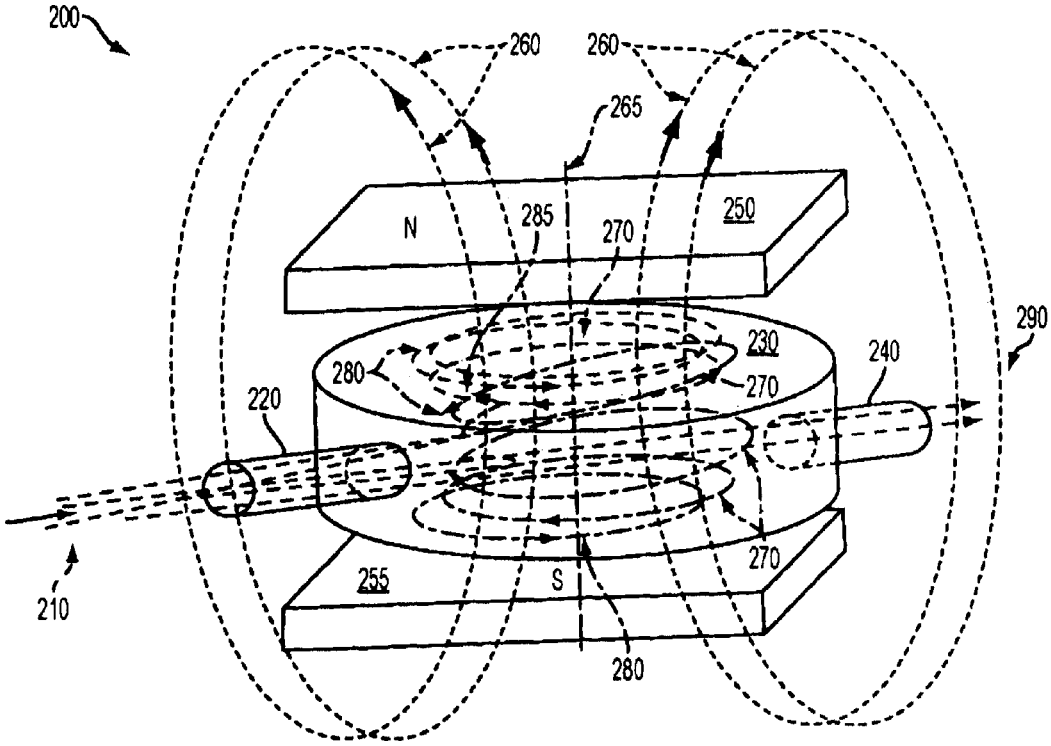
FIG. 2 shows an isometric view of a magnetic concentrator in accordance with a second embodiment.

As described for a second embodiment, the magnetic concentrator uses a magnetic field to accumulate charged particulates so as to achieve a critical threshold required for sensor activation or alarm. FIG. 2 illustrates an isometric conceptual view for a single exemplary concentration device 200. The concentrator 200 can be utilized for CBR detection as a stand alone unit, or can be stacked to achieve desired levels of filtration. Concentrated particulates can then be detected using traditional methods.

The concentration device 200 receives an inflow 210 of gas (e.g., air) and particulate matter into an intake duct 220 through which the gas and particles enter a cylindrical chamber 230 that is connected to an exit duct 240. The intake and exit ducts 220, 240 lie along a flow axis that may but need not be straight. A north (N) magnet end 250 and a south (S) magnet end 255 in combination produce a magnetic field 260. The N and S portions may be disposed on upper and lower sides of the chamber 230 with the field vector directed from north to south as shown such that a magnetic field axis 265 may be transverse (i.e., intersect) the flow axis. In preferred embodiments, the magnetic field axis 265 may be substantially perpendicular to the flow axis formed by the intake and exit ducts 220, 240.

Dust and other small particles entrained in gasesous flow readily acquire an electric charge from collisions with neighboring molecules. In the orientation shown, positively charged particles 270 turn counterclockwise, whereas negatively charged particles 280 turn clockwise. Some particles 285 spiral from one elevation to another without escaping the chamber 230. Thus, the particles 270, 280 are collected in the upper and lower portions of the chamber 230, enabling filtered gas 290 to flow through the exit duct 240.

Figure 3:
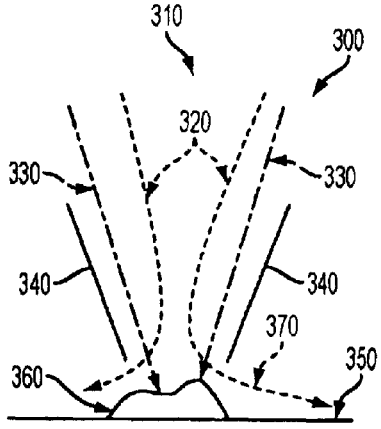
FIG. 3 (Related Art)
FIG. 3 shows an elevation view of an inertial particle separator.

By contrast, the predominant method underlying conventional particle concentrators relies upon the inertia of a particle and impaction onto a surface in order to achieve the necessary concentration required for activation of a detector. An elevation schematic of this inertial concept for a conventional concentrator 300 is shown in FIG. 3. The concentrator 300 receives an inflow 310 of gas 320 and particles 330 through a funnel 340 downstream of which is an impact deflector 350.

The particles 330 are deposited as a collection 360 onto the windward surface of the impactor 350, which deflects the gas flow that exits the filter 340 as a filtered and deflected gas 370. These devices may be engineered so as to minimize particle accumulation along the walls of the channeling passageways and account for different particulate masses to minimize sampling bias in terms of size distributions. They also require power to create and maintain flow through narrow and winding passageways.

Figure 4:
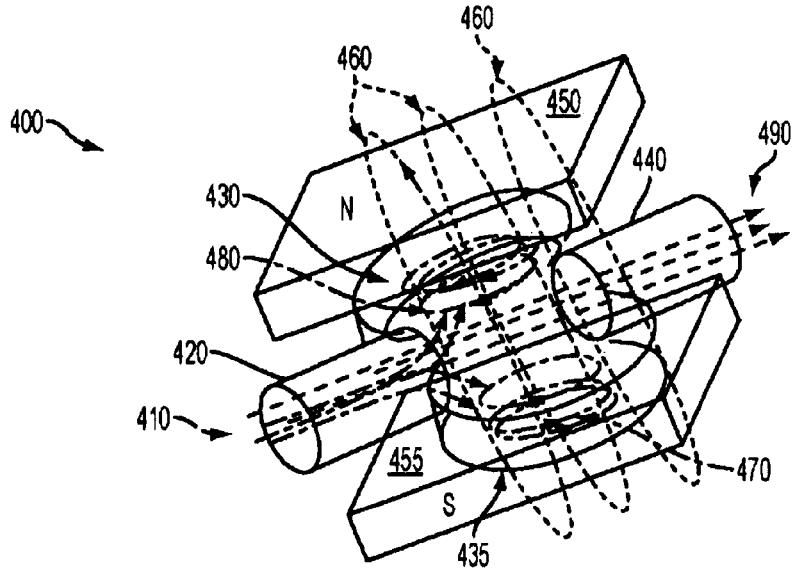
FIG. 4 shows an isometric view of a magnetic isolator in accordance with a third embodiment.

As described in a third embodiment, the magnetic isolator separates out charged particulates from a fluidic (i.e., liquid or gaseous) flow stream without obstructing the flow and concentrates them in separate chambers to allow detection. FIG. 4 illustrates an isometric conceptual view for a single exemplary isolation device 400. The isolator 400 can be utilized for CBR sensors. Filtered out and concentrated particulates can then be detected using traditional methods or novel techniques due to the fact the particulates will be suspended in air as opposed to deposited upon surfaces.

The isolation device 400 receives an inflow 410 of gas (e.g., air) and particulate matter into an entrance duct 420 through which the gas and particles enter a region flanked above and below by cylindrical chambers 430 and 435 respectively. The region that includes the upper and lower chambers 430, 435 is connected to an egress duct 440. A north (N) magnet end 450 and a south (S) magnet end 455 in combination produce a magnetic field 460. The N and S portions may be disposed on upper and lower sides of the chamber 430 with the field vector directed from north to south as shown.

Dust and other small particles entrained in gaseous flow readily acquire an electric charge from collisions with neighboring molecules. In the orientation shown, positively charged particles 470 turn counterclockwise and enter the lower chamber 435, whereas negatively charged particles 480 turn clockwise and enter the upper chamber 430. Thus, the particles 470, 480 are collected and trapped in the upper and lower chambers 430, 435, enabling filtered gas 490 to flow through the egress duct 440.

Conventional systems in sensors provide separate implementation for filtration and concentration. Such filtering systems are mechanically or electrostatically based, and the predominant method underlying conventional concentrators relies upon the inertia of a particle and impaction onto a surface such as shown in FIG. 3. Hence, conventional systems require a power supply to overcome pressure losses from the obstruction introduced into the flow and/or the triggering of turbulence to provide such inefficient filtration.

By contrast, exemplary embodiments of the magnetic separator do not inhibit fluid or gas flow and obviates power requirements if permanent magnets are utilized. The isolator 400 provides a means of concentration that keeps particulates suspended allowing novel detection techniques to be explored and can be monitored more readily. Several such isolation units can be concatenated along the flow to augment the filtration quality.

Artisans of ordinary skill will recognize that the intake and outlet ports through which the medium flows can be disposed along a flow axis within a (substantially flat) flow plane. The embodiments described provide substantially straight paths therethrough, although flow direction can be turned within the flow plane without departing from the spirit of the invention. Correspondingly, the magnet poles can be disposed along a pole axis. In order to act on particles, the Lorentz force operates in a plane that differs from the flow direction of the medium. Thus, the magentic field's pole axis may be transverse to (i.e., differ from), and preferably be substantially perpendicular to, the flow plane and thereby to the flow axis.

Figure 5:
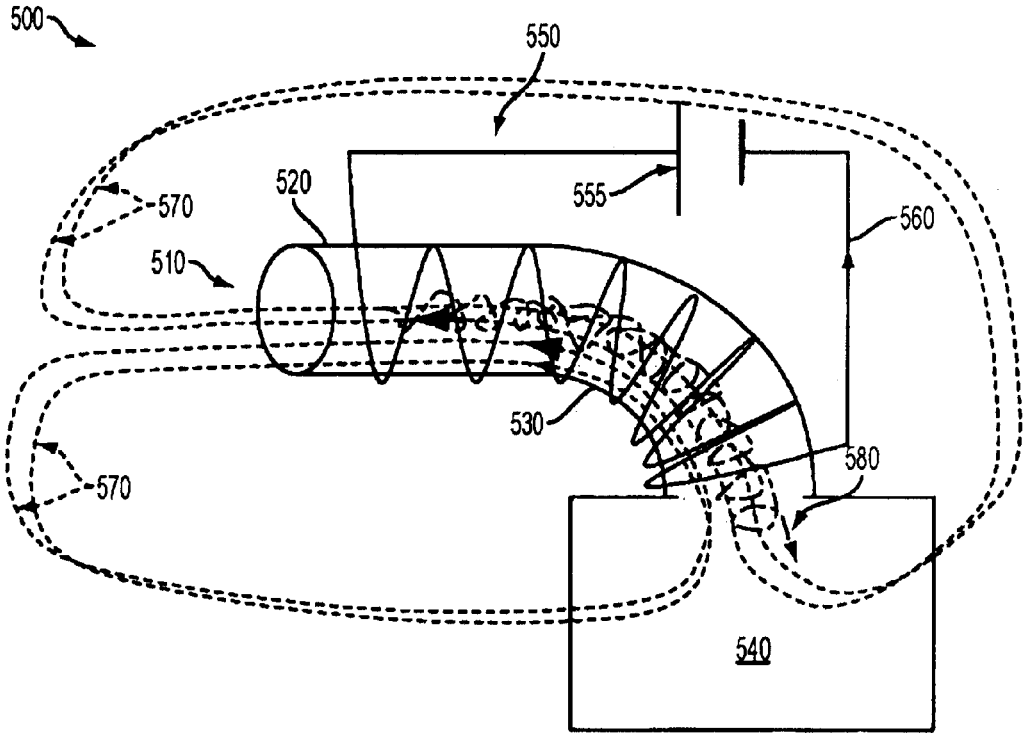
FIG. 5 shows an elevation view of a solenoid collector in accordance with a fourth embodiment.

As described in a fourth embodiment, the magnetic deposition inhibitor uses a magnetic field to control the flow of charged particulates so as to mitigate unwanted deposition on the interior of environmental samplers and/or detectors. FIG. 5 illustrates an isometric conceptual view for a single exemplary deposition inhibitor device 500 for a curved flow geometry. The inhibitor 500 can be utilized for CBR detection. Particulates can then be captured for processing in a collector using traditional methods.

The concentration device 500 receives an inflow 510 of gas (e.g., air) and particulate matter into an intake duct 520 through which the gas and particles enter an elbow conduit 530 that connects to particle collector 540. An electric solenoid circuit 550 driven by a power supply 555 (e.g., battery) produces an electric current 560. The circuit 550 is helically wound around the elbow conduit 530 to produce a magnetic field 570 that acts on the particles 580, which spiral into the collector 540.

To accurately sample the ambient environment for CBR defense, it is imperative to reduce, if not eliminate, unwanted particulate deposition on the interior walls of the collector/detector system. The magnetic inhibitor utilizes the well known magnetic field properties of a solenoid generated by a current-carrying wire wrapped around the exterior of a curved cylinder, such as the elbow 530. Artisans of ordinary skill will recognize that a charged particulate 580 follows a magnetic field line in a helical fashion as depicted in FIG. 5.

Moreover, the particle (in a vacuum) does not wander from the field line greater than the helical radius r given in the following formula:

$$|F_B| = |qv \times B| = \frac{mv^2}{r}, \tag{2}$$

where $|F_B|$ is the magnitude of the Lorenz force vector, q is the particle charge, v is the velocity vector, with B is the magnetic field vector, m is the particle mass, v is the velocity magnitude and r is the radius of the helical travel path. Thus, because the magnetic field lines 570 of a solenoid converge to—and become highly concentrated along—the center axis of the intake duct 520 and elbow 530, the particles 580 move away from the walls and travel toward and along the center of the cylinder. This will then reduce if not eliminate the interaction between the particles and the walls.

The above-described magnetic-field separation embodiments for the filter, concentrator, isolator and deposition inhibitor all depend upon the use of a magnetic field to control the transport of aerosols contained in air flow. These concepts therefore are applications of the science of magneto-aerodynamics that has developed sufficient technological maturity to have produced a well established theoretical framework resulting in numerous publications on various and sundry applications.

Germane to the embodiments described above is the concept of the magnetic body force per unit volume $f_m$ that acts upon a volume of gas (air-plus-aerosols) when subjected to an applied magnetic field vector B. This body force takes the mathematical form as follows:

$$f_m = \frac{1}{2}\nabla\left[H^2\rho\left(\frac{\partial\mu}{\partial\rho}\right)_T\right] - \frac{H^2}{2}\nabla\mu + \mu(j \times H), \tag{3}$$

where μ is the magnetic permeability, H the magnetic field intensity, p is the gas density, T is the constant temperature condition for permeability variation with gas density, j is the electric current density vector, and H (=μB) is the magnetic field intensity vector. In addition, ∇represents the gradient differential vector operator, expressed as $$\nabla = \sum_i n_i \frac{\partial}{\partial x_i},$$

such that $n_i$ is a normal vector and $\partial/\partial x_i$ is the partial derivative with respect to the normal direction. Eqn. (3) is obtained from L. D. Landau and E. M. Lifshitz, *Electrodynamics of Continuous Media,* Pergamon, © 1960, Chap. 4.

In the absence of aerosol, the ambient air is paramagnetic and therefore responds to the presence of a magnetic field as discussed in several publications, such as B. Bai, A. Yabe, J. Qi and N. I. Wakayama "Quantitative Analysis of Air Convection Caused by Magnetic-Fluid Coupling", *AIAA Journal,* vol. 37, No. 12, Dec. 1999. Most gases are diamagnetic (contrast susceptibility), whereas oxygen and nitrogen are paramagnetic (inverse-temperature varying susceptibility).

Under no-flow conditions, the last term in eqn. (3) involving the electric current density vector j may be set to zero, corresponding to no air velocity. The remaining terms describe the response of air alone to the applied magnetic field. This air response represents a significant effect in the context of the above-described embodiments. This can be expressed by the approximation relation from Bai et al.:

$$f_m \approx \frac{1}{2}\mu_0 \chi_{O_2} Y_{O_2} \rho \nabla H^2 \tag{4}$$

where $\mu_0$ is vacuum permeability, $X_{O2}$ is magnetic susceptibility of oxygen per unit mass for diatomic oxygen, and $Y_{O2}$ is mass fraction of oxygen $O_2$ in air. Magnetic susceptibility for oxygen is a function of temperature, and has a comparatively high value at 300K (kelvin) of $107.8\times19^{-5}$ $cm^3/g$ (about two orders of magnitude greater than most other gasses).

Absence of such body force response in air would cause flow resistance of charged aerosols across the ambient flow due to ensuing interaction between the aerosol and air. Fortunately, the behavior of oxygen provides impetus for the particles to be entrained with the air flow from the enhanced body force, rather than being dragged back. Hence, setting current density to zero represents a conservative estimate for body force. Under the assumption of no charged aerosols, Bai et al. have dramatically shown that magnetic fields accelerate and collimate air into highly symmetric flow. These experimental results without and with an induced electromagnetic field are shown in FIGS. 6A and 6B to illustrate this contrast.

Figure 6A:
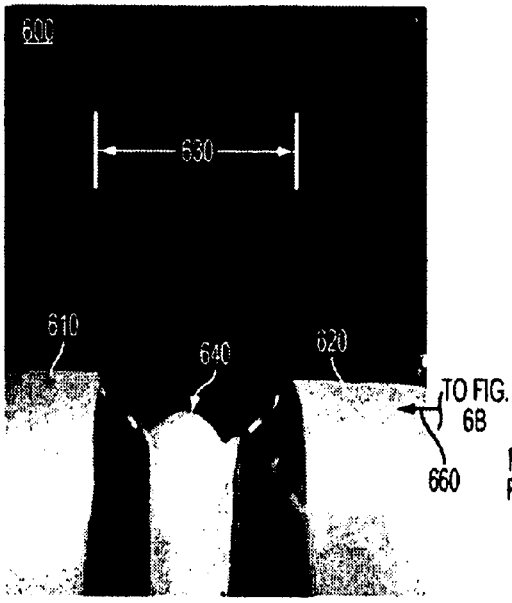
FIG. 6A (Related Art)
FIGS. 6A–6B show photographic elevation views of air in a chamber in the respective absence and presence of a magnetic field.
Figure 6B:
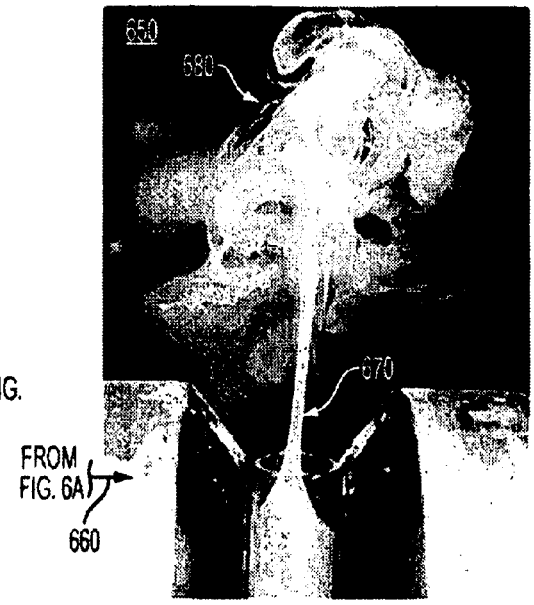
FIG. 6B (Related Art)

The photograph in FIG. 6A shows a gaseous discharge experimental arrangement 600 without a magnetic field. The electromagnets 610, 620 flank a tube for injecting a static column of nitrogen gas 640 upward. The inner diameter 650 of the tube is 1.6 cm, and the nitrogen 640 is visually indicated by an ultrasonic nebulizer. The photograph in FIG. 6B shows the experimental arrangement 650 with the magnetic field having a peak strength of 1.5 T (i.e., tesla) at a centerline (horizontal x=0 centimeter, cm) position approximately indicated by the double-arrow 660 (corresponding to vertical y=3 cm). Nitrogen is ejected upward as a jet 670 and yielding a plume 680 visible indicated by the nebulizer.

Figure 7:
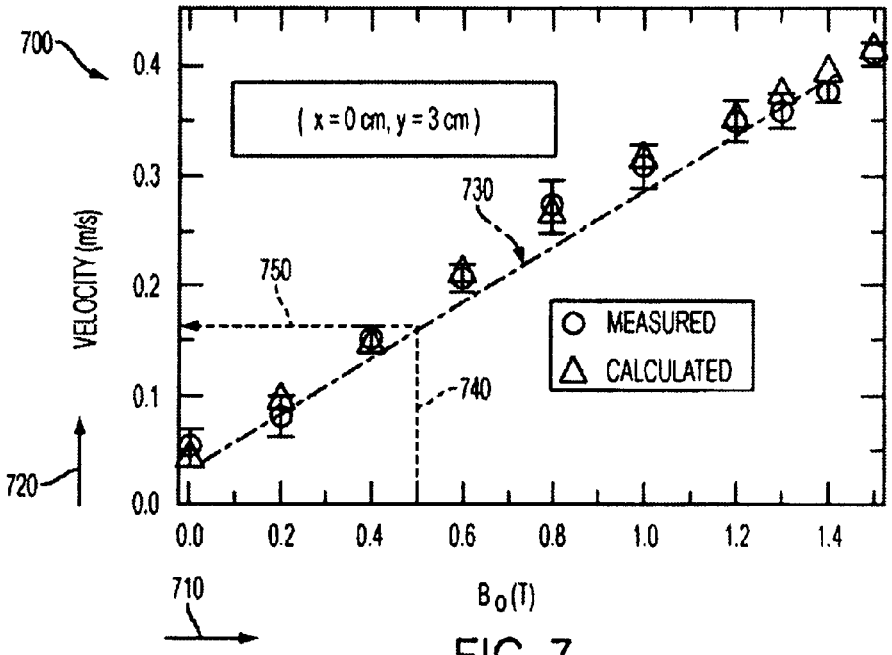
FIG. 7 shows a graphical plot of induced velocity in response to magnetic field strength.

Additionally, Bai et al. quantified via numerical solution and experimental measures the resulting accelerations of the $N_2$ molecules in air when subjected to various strengths of magnetic field. These data, originally presented in Bai et al., is reproduced in FIG. 7 as a plotted graph 700. The abscissa 710 represents the magnetic flux density along the centerline $B_0$ (in tesla, up to ~1.5 T), while the ordinate 720 represents the resulting velocity v (in meters-per-second, m/s) of the nitrogen medium. Such static strengths are availble with rare earth magnets composed of $Nd_2Fe_{14}B$ (neodymium-iron-boron). The plot 700 includes calculation and measured data for which a linear curvefit 730 can be calculated as v=0.254 $B_0$+0.02 (at x, y=0, 3 cm). Thus, a magnetic field flux 0.5 T (or 5 kilo-gauss) shown by line 740 can be extrapolated to indicate that the $N_2$ molecules accelerate from rest to a speed of approximately 0.15 or 0.16 m/s shown by line 750. Thus, expected gas flow velocities induced by the magnetic field should be expected to range between 0.1 m/s and 0.2 m/s.

Artisans of ordinary skill will recognize that the example embodiments act on charged aerosols that are more strongly affected by the presence of a magnetic field through the Lorenz force, shown as the third term in eqn. (3), the quantitative results of Bai et al. in terms of size dimensions (centimeters) and field strengths (tenths of Tesla) establish the feasibility of using magnetic fields concentrate, separate and collimate as envisaged and described for the described embodiments.

To estimate the effects of including the Lorenz force, crude visual demonstrations have been performed using a 0.5 T permanent magnet on a 5 mi/hr (~30 m/s) flow of aerosol (smoke) at Naval Surface Warfare Center—Dahlgren and have observed an approximate deflection of 5° (degrees) of the smoke stream. Roughly, this translates into a tangential acceleration that resulted in an approximate tangential flow speed of 260 cm/s over about a distance of between 2 cm and 3 cm.

Summary: The study of "magnetoaerodynamics" can be important to control airflows. The magnetically induced change in the velocity of $O_2$ gas streams injected into air was quantitatively studied. Whether $O_2$ gas flow was magnetically accelerated or decelerated was found to depend on the sign of the magnetic field gradient applied at the $O_2$ outlet. The magnetically induced change in the velocity $\Delta v=\nabla v_H-v_0\nabla$ was found to increase by increasing the product of the magnetic intensity and its gradient, H (dH/dy), and lowering the velocity without the fields, $v_0$. The dynamics of this magnetically induced gas flow was explained by considering the magnetic force acting on the paramagnetic oxygen gas. The calculation shows the most efficient acceleration to occur in stationary medium (i.e., $v_0$=0 cm/s). The result of this study indicates the availability of magnetic control of gas streams containing $O_2$ gas. The necessary conditions are the gradient of the $O_2$-gas concentration, the low-velocity without fields $v_0$, and high quantity of magnetic field density H gradient with respect to the flow direction, i.e., dH/dy.

The magnitudes presented herein provide a quantitative measure of magnetic field strength necessary to deflect the medium and/or the particles entrained therein. The techniques described explain a variety of applications for separation of particles from medium flow using either a permanent magnet or an electromagnet that can be switched on or off as appropriate. Alternatively, the electromagnet can be applied with an alternating current to produce a sinusoidal fluctuation in the magnetic field strength. Although the examples described herein focus primarily on gaseous media, the principles applied can be readily extended to liquid media, as will be recognized by artisans of ordinary skill.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A method for separation of entrained aerosol particles having one of positive and negative charges from a medium, the method comprising:

disposing intake and outlet ports, into and out of which respectively the medium flows contiguously, the ports being disposed along a curved flow axis;

connecting an annular elbow to the intake port;

connectably disposing a collector between the annular elbow and the outlet port;

winding an electric circuit around the annular elbow to produce a magnetic field within the annular elbow along the flow axis; and applying, by the magnetic field, Lorentz force on the particles to deflect the particles toward the collector.

2. The method according to claim 1, wherein the medium is air and the magnet produces peak magnetic field strength of 0.5 tesla to induce motion of the particles between 0.1 and 0.2 meters-per-second.

3. A device for separation of entrained aerosol particles from a medium, the particles having one of positive and negative charges, the method comprising:

intake and outlet ports, into and out of which respectively the medium flows contiguously;

an annular elbow connecting to the intake port;

a collector connecting between the annular elbow and the outlet port, the ports being disposed along a curved flow axis; and an electric circuit helically wound around the annular elbow to produce a magnetic field within the annular elbow along the flow axis, wherein the magnetic field, by Lorentz force, deflects the particles toward the collector.

4. The device according to claim 3, wherein the medium is air and the magnet produces peak magnetic field strength of 0.5 tesla to induce motion of between 0.1 and 0.2 meters-per-second.

* * * * *